United States Patent
Hurley et al.

(10) Patent No.: US 8,453,229 B2
(45) Date of Patent: May 28, 2013

(54) PUSH TYPE COMMUNICATIONS SYSTEM

(75) Inventors: Jesse D. Hurley, Natick, MA (US); Seth Voltz, Natick, MA (US)

(73) Assignee: Anamorphic Systems, Inc., Natick, MA (US)

( * ) Notice: Subject to any disclaimer, the term of this patent is extended or adjusted under 35 U.S.C. 154(b) by 759 days.

(21) Appl. No.: 11/762,691

(22) Filed: Jun. 13, 2007

(65) Prior Publication Data
US 2008/0010480 A1    Jan. 10, 2008

Related U.S. Application Data

(60) Provisional application No. 60/804,701, filed on Jun. 14, 2006.

(51) Int. Cl.
*H04L 29/00*    (2006.01)
(52) U.S. Cl.
USPC .............. 726/12; 713/152; 713/155; 713/168
(58) Field of Classification Search
USPC .................... 713/153, 168, 155, 152; 726/12
See application file for complete search history.

(56) References Cited

U.S. PATENT DOCUMENTS

| | | | |
|---|---|---|---|
| 6,119,167 A | 9/2000 | Boyle | |
| 6,203,192 B1 | 3/2001 | Fortman | |
| 6,356,956 B1 | 3/2002 | Deo et al. | |
| 7,139,828 B2 * | 11/2006 | Alkhatib et al. | 709/230 |
| 7,299,349 B2 * | 11/2007 | Cohen et al. | 713/150 |
| 2002/0059380 A1 | 5/2002 | Biliris et al. | |
| 2004/0193679 A1 | 9/2004 | Tecco et al. | |
| 2006/0149655 A1 * | 7/2006 | Leahy et al. | 705/37 |

OTHER PUBLICATIONS

Juvva, Kanaka, et al, A Real-Time Push-Pull Communications Model for Distributed Real-Time and Multimedia Systems, Jan. 1999, CMU-CS-99-107, Carnegie Mellon Univ.—pp. 1-19.
Lepori, Benedetto, Push communication services: a short history, a concrete experience and some critical reflections, Studies in Communication Sciences 2/1 (2002) 149-164.
Goldberg, Ian, et al; Off-the-Record Messaging, http://www.cypherpunks.ca/otr/.
Waste Project; http://waste.sourceforge.net/.
The Chord/D/Hash Project—Overview; http://pdos.csail.mit.edu/chord/; Dec. 7, 2006.

* cited by examiner

*Primary Examiner* — Eleni Shiferaw
*Assistant Examiner* — Paul Callahan
(74) *Attorney, Agent, or Firm* — San Diego IP Law Group, LLP

(57) ABSTRACT

Systems and methods for pushing messages, arbitrated by a Control Manager, to local and remote client computer modules in a networked architecture. The messages may include voice, video, text and data communications. The system provides a Control Manager, which comprises the Event Manager, the Authentication Manager, and the Secure Connection Maintainer. The Event Manager, a trusted module, passes messages between local and remote modules using established, and possibly secure, connections, and provides message receipt verification and reply/return message capabilities to the event-triggering module. Messages may be also encrypted. The Authentication Manager, also a trusted module, provides authentication and authorization services. The Authentication Manager is responsible for handling client identification, authorization, and authentication across a secured communications channel. The Secure Connection Maintainer monitors the connections between the Control Manager and its trusted modules and the remote modules.

23 Claims, 4 Drawing Sheets

PUSH TYPE COMMUNICATIONS SYSTEM

CROSS REFERENCE TO RELATED APPLICATION

This application is based upon and claims the benefit of priority from U.S. provisional application No. 60/804,701, filed Jun. 14, 2006, the entire contents of which are incorporated by reference herein.

FIELD OF THE INVENTION

This invention relates generally to the field of message communications. More specifically, this invention relates to systems and methods for pushing messages, arbitrated by a control manager, to local and remote client computer modules connected in a networked architecture. The messages may include voice, video, text and data communications.

BACKGROUND OF THE INVENTION

Push communications or push messaging systems have been used to send email, news, and other relatively small pieces of data to an end-user client without a direct request from that client. These systems are typically point-to-point infrastructures, in which a single client subscribes to a particular source and receives a message from a single originator. Existing push communications systems, though, may be plagued by overly complex architectures, and often do not scale well. For example, if a push communications system permits multiple clients to subscribe to the same source, the server must typically iteratively push information to each of these clients.

Push communications systems often provide limited, if any, security measures. This lack of security has sometimes led to problems such as forged messages, where the sender claims to be someone or something else. As a result, falsified data may be passed along as fact, and a recipient may, in response, act on sensitive or critical data and expose other systems to vulnerabilities.

To date, most push communications systems have only supported basic textual data, or have implemented complex client-side software to support arbitrary data streams. This has been a disincentive to using push communications for the delivery of voice and video information. Further, sending a large amount of textual data has typically required a large overhead, relative to the message size, in order to properly rebuild a message received in segments.

In some push communications systems, a message pushed to an end-user client is assumed to be have been properly received. Alternatively, in some other systems, a series of back-and-forth messages, which add to the system's overhead, are used to confirm delivery. In order to respond to a pushed message, a client may have to instantiate a new message to the server, which may in turn be pushed to other clients. Instead of an optimized return and receipt protocol, then, the same procedure used to receive a message is executed in reverse.

Variations of push communications have been used in some content distribution networks (CDNs) in the form of one-to-one control codes that instruct the client where to pick up data for a requested file. While this may reduce some of the overhead required in a traditional query-response or pull system, it is still not optimal. The lack of a trust model between network peers and the absence of a true central control structure to moderate and arbitrate connections may limit scalability and network availability and result in stored data redundancy. In addition, routing may be an issue when data leaves a controlled private network and enters the realm of the public Internet. Once a transmission leaves the private network, it must follow the routing paths deemed appropriate by the traversed sub-networks. To date, a method for efficiently moving messages containing voice, video, text and data communications from a source to a destination through an externally controlled path has not been demonstrated.

SUMMARY OF THE INVENTION

The present invention provides systems and methods for pushing messages, arbitrated by a Control Manager, to local and remote client computer modules in a networked architecture. The messages may include voice, video, text and data communications.

In a preferred embodiment, the present invention provides a Control Manager, which is comprised of several modules that have implicit trust (i.e., are trusted modules) and provide separable functionality. The Control Manager is the core of the Push Communications System and provides encryption services, authentication services, event message transmission, connection instantiation notices, and other push-type communications services.

The Control Manager preferably comprises the Event Manager, the Authentication Manager, the Secure Connection Maintainer, and a Timer. The Event Manager, a trusted module, passes messages between local and remote modules using established, and possibly secure, connections, and provides message receipt verification and reply/return message capabilities to the event-triggering module. Messages may be also encrypted. The Authentication Manager, also a trusted module, provides authentication and authorization services. The Authentication Manager is responsible for handling client identification, authorization, and authentication across a secured communications channel. The Secure Connection Maintainer monitors the connections between the Control Manager and its trusted modules and the remote modules. The Secure Connection Maintainer uses the Timer to monitor the status of these connections.

In a preferred embodiment, authorized and authenticated modules may register for, trigger, and receive events from the Event Manager or, at the discretion of the Control Manager, may open an arbitrated, secure connection with another module for direct communication. Upon establishing a persistent connection with the Event Manager, remote modules may register with the Event Manager to trigger events and to receive event notifications pushed by the Event Manager. Network communications between modules and the Event Manager, and among modules arbitrated by the Event Manager, can be monitored and analyzed for fail-over and statistics collection. Fail-over to the Event Manager can occur if messaging between modules results in bandwidth- or communications-related errors. Such errors include, but are not limited to, high latency, low reliability, and disconnected modules.

Events triggered by authorized modules are routed through the Event Manager to all registered receiving modules, along with additional data fields containing the triggering module's identifier, and optionally, a field designating a return path for receipt or reply messages. If requested or required, upon receipt by the receiving module(s), the Event Manager or the receiving module(s), returns a receipt or a reply to the triggering module.

BRIEF DESCRIPTION OF THE DRAWINGS

Other objects, features and advantages will occur to those skilled in the art from the following description of the preferred embodiments and the accompanying drawings, in which.

DESCRIPTION OF THE PREFERRED EMBODIMENTS

The present invention provides systems and methods for pushing messages, arbitrated by a control manager, to local and remote client computer modules in a networked architecture. The messages may include voice, video, text and data communications.

Figure 1:
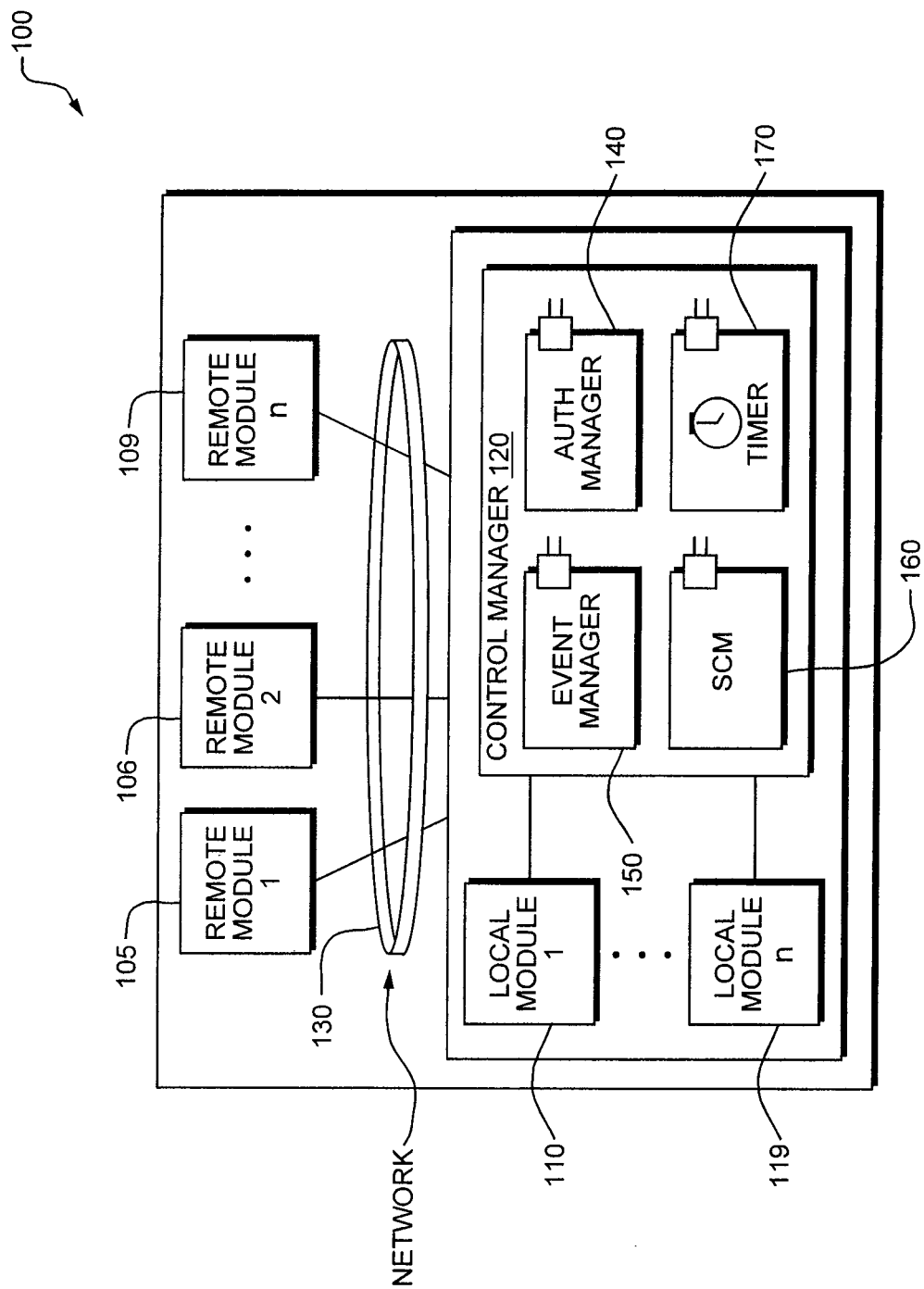
FIG. 1 is a block diagram of a preferred embodiment of a system for pushing messages to local and remote client modules, in accordance with the present invention.

A block diagram of the preferred embodiment of the invention is shown in FIG. 1, in which Push Communications System 100 comprises the following components: Remote Modules 105, 106 and 109; Local Modules 110 and 119; Control Manager 120; and Network 130. In a preferred embodiment, Push Communications System 100 is implemented as part of a content distribution network, and Remote Modules, Local Modules and Control Manager each include a networked computer running a Windows-based operating system, although other operating systems, including variants of the Linux operating system and Mac OS (Apple Inc.'s operating system for Macintosh computers) are contemplated and within the scope of the invention. Communications within Push Communications System 100 may be made via standard network protocols, preferably using TCP (Transmission Control Protocol), although other protocols, including but not limited to UDP (User Datagram Protocol) are contemplated and within the scope of the invention.

Control Manager 120 is further comprised of a set of trusted modules, including Authentication Manager 140, Event Manager 150, and Secure Connection Maintainer 160. Control Manager 120 also includes Timer 170. The trusted modules of Control Manager 120 provide a set of services, including but not limited to encryption services, authentication services, message transmission, and connection instantiation notices.

In Push Communications System 100, Remote Modules 105, 106 and 109, and Local Modules 110 and 119, each connect to central Event Manager 150 through persistent connections. These persistent connections are used for all communications between the modules and the Event Manager. A module is considered local if it resides on the same physical system as Event Manager 150, or it resides on a trusted system connected via a secure link and listed in a trust list maintained by Event Manager 150. All other modules are considered remote.

In a preferred embodiment, a trusted system is one in which modules physically reside in the same rack or controlled facility, such that a private wire can be set up between individual computers. A secure link is any connection that is configured with a reasonable expectation that communications across the link are viewable only by the modules that are directly connected to the link. In a preferred embodiment, the links between the Event Manager and the Remote Modules are not encrypted. In alternate embodiments, however, the links between the Event Manager and the Remote Modules may be encrypted or otherwise secured.

Authentication Manager

With further reference to FIG. 1, Authentication Manager 140, a trusted module, provides authentication and authorization services to Push Communications System 100. Authentication Manager 140 is responsible for handling the client identification process and ensuring modules are secure before events and event registrations are passed between the modules and the Event Manager.

Figure 2:
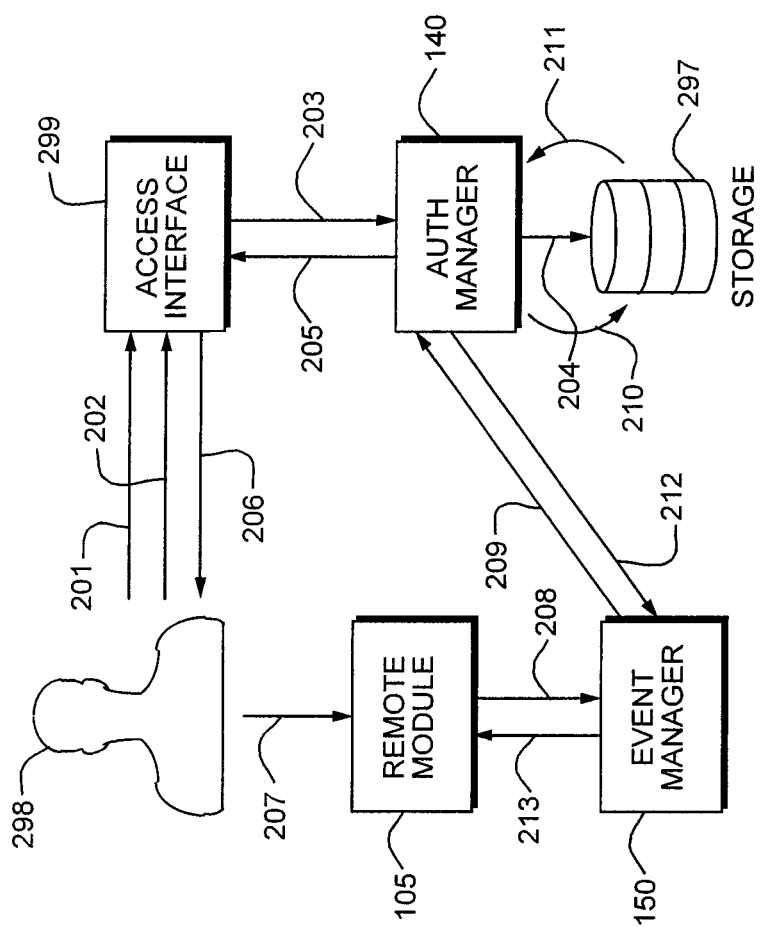
FIG. 2 is a flow chart of the authentication and authorization process of the embodiment shown in FIG. 1.

A module, whether a Remote Module or a Local Module, must be authorized and authenticated before it can register for, trigger, and receive events from Event Manager 150. A preferred embodiment of the authentication and authorization process of the present invention is shown in FIG. 2.

In step 201, Client 298 connects to Access Interface 299 using a method of identification, such as by sending identity credentials. Client 298 sends a login name and password to Access Interface 299, although other methods of identification known in the art are contemplated and within the scope of the invention. In a preferred embodiment, Access Interface 299 acts as a proxy for Authentication Manager 140, and is an encrypted web page-style login form connected to Authentication Manager 140. In an alternative embodiment, Client 298 may connect directly to Event Manager 150 through Remote Module 105.

If Access Interface 299 successfully verifies the identity credentials of Client 298 in step 201, Client 298 requests access to Push Communications System 100 via Access Interface 299, as shown in step 202, by requesting a connection between Remote Module 105 and Event Manager 150. If, however, the identify credentials of Client 298 are not successfully verified in step 201, Authentication Manager 140 returns an exception to Access Interface 299 indicating the specific failure, including but not limited to invalid login name, incorrect password, or connection timed out. Access Interface 299 may in turn notify Client 298 of the exception. In a preferred embodiment, Access Interface 299 provides a web-based interface to display the exception, and also logs the exception for reporting purpose. In addition, in a preferred embodiment, Authentication Manager 140 incorporates a retry mechanism, and permits Client 298 to make a number of identification attempts before returning an exception to Access Interface 299.

In step 203, if the identify credentials of Client 298 were successfully verified in step 201, Access Interface 299 passes the identity credentials of Client 298 to Authentication Manager 140 and requests a new token from Authentication Manager 140.

In step 204, Authentication Manager 140 creates the requested token. In a preferred embodiment, the token is a unique random large number or string, such that there are a sufficient number of tokens at any one time to avoid any overlap with the number of simultaneous connection attempts. The token may be generated by using a random number generator followed by a check to verify that the generated number is not already in use, by a one-way hash of some portion of the identity credentials and the current time, or by other means known in the art. Authentication Manager 140 also saves the token and the identity credentials in its Local Storage 297. In a preferred embodiment, Local Storage 297 is a database. The token and identity credentials are saved in Local Storage 297 until the connection between Remote Module 105 and Event Manager 150 is established.

In step 205, Authentication Manager 140 sends a copy of the token back to Access Interface 299.

In step 206, Access Interface 299 passes connection information back to Remote Module 105. Connection information includes the connection method, and the token. In a preferred embodiment, the connection method includes the location of the Event Manager, which may be an IP (Internet Protocol) address, although in other embodiments, the location may be any method of uniquely locating the Event Manager, such as a domain name or user name, and may be statically or dynamically created.

In step 207, Client 298 connects to Remote Module 105 using the connection method returned by Access Interface 299.

In step 208, Remote Module 105 sends the token to Event Manager 150 to establish a connection. At this point, a persistent connection between Remote Module 105 and Event Manager 150 is established. In a preferred embodiment, the persistent connection is a TCP or UDP socket connection. The socket connection is maintained using techniques well-known in the art, including but not limited to keep-alive messages. Secure Connection Maintainer 160, discussed below, also functions to maintain the persistent connection between Remote Module 105 and Event Manager 150.

In step 209, Event Manager 150 sends an identity request, to verify the identity of the Remote Module, to Authentication Manager 140. The identity request includes the token.

In step 210, Authentication Manager 140 looks up the token in its Local Storage 297, retrieves the associated identity credentials, as shown in step 211, and forwards the identity credentials, as shown in step 212, to Event Manager 150. The Authentication Manager then deletes the token and corresponding identity credentials from Local Storage 297, to free up the Local Storage space for another connection.

In step 213, if the identify is successfully retrieved, Event Manager 150 sends an authorization to connect to Remote Module 105. If Authentication Manager 140 is unable to retrieve the identity credentials, an error message is sent to Remote Module 105, authorization to connect is denied, and the connection between Remote Module 105 and Event Manager 150 is closed.

Event Manager

With further reference to FIG. 1, Event Manager 150, a trusted module, provides message-passing services for Push Communications System 100. Event Manager 150 passes messages between modules with established connections, and provides message receipt verification and reply/return message capabilities to the event-triggering module.

Upon receiving an authorization to connect from Event Manager 150, as described above with reference to FIG. 2, a module may register, with Event Manager 150, a list of the events that it can transmit and receive. Events may contain additional data, which may in turn be used by the recipient modules. For example, in a CDN application that delivers video, events may include "Start Video" with a data field for the video location; "Stop Video;" "User Connected" with a data field for the user name; and "Error Message" with a data field for the error. The list of events is preferably stored in an Event Database 399, FIG. 3, and is used for both message routing and security purposes. Event Manager 150 prevents modules from transmitting and receiving events that the module has not registered. Alternatively, at the discretion of Control Manager 120, a Remote Module may open an arbitrated secure connection to another Remote Module for direct communication between the two Remote Modules.

Once a module has registered to send a particular event, the module may instantiate the event-triggering process. A module sends an event, containing the event designation and optional additional data, including but not limited to message-reply and message receipt flags, user names, file names and locations to Event Manager 150 through the persistent connection established between the Event Manager and the module. When the Event Manager 150 receives the message, the sending module's information may be appended to the message as additional data fields, and the message is added to an Event Queue (not shown) for processing. The sending module's information may include, but is not limited to, its IP (Internet Protocol) address or user identifier and public key, for use with encrypted messages. When the message reaches the top of the Event Queue, Event Manager 150 searches Event Database 399, FIG. 3, for registered event recipients, and the event is forwarded to each registered recipient module. If there are no registered event recipients in Event Database 399, the event is deleted.

Depending upon whether the message-receipt and message-reply flags are set, upon receipt of the event, the recipient module may reply to the sending module, or Event Manager 150 may provide a return receipt to the sending module. Return receipts are not processed as events.

Figure 3:
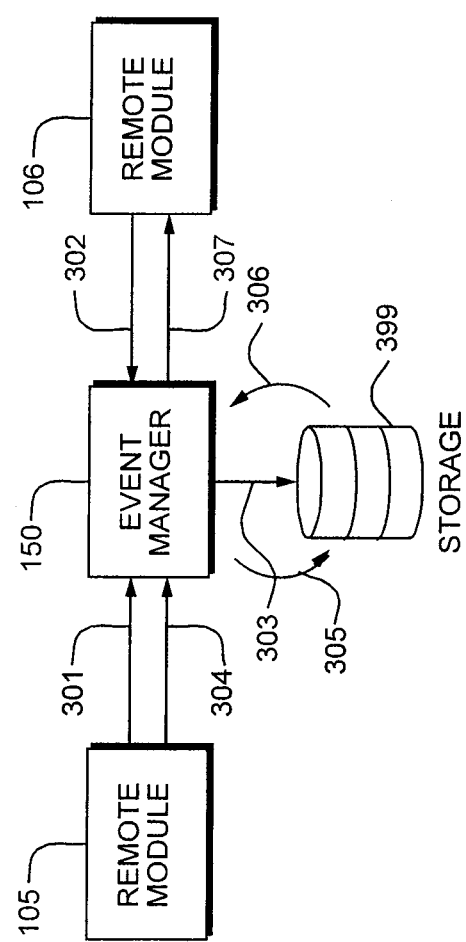
FIG. 3 is a flow chart of the process for sending an event, in accordance with the embodiment of FIG. 1.

The process for sending an event is shown in FIG. 3.

In step 301, Remote Module 105 registers with Event Manager 150 as accepting events A and B, and sending events C and X. In step 302, Remote Module 106 registers with Event Manager 150 as accepting events A and X, and sending events B and C. In step 303, Event Manager 150 stores the event registration information received from Remote Modules 105 and 106 in Event Database 399.

In step 304, Remote Module 105 sends event X to Event Manager 150 through the established connection. In response, Event Manager searches Event Database 399 for modules that have registered to accept event X, as shown in step 305. In step 306, the search results, indicating that Remote Module 106 has registered to accept event X, is returned to Event Manager 150. In step 307, Event Manager 150 sends event X to Remote Module 106 through the established connection.

Event Manager 150 will send the event to all modules that have registered to accept the event, even if the event is being sent back to the event-triggering module. If a module attempts to send an event for which it has not registered to send, Event Manager 150 returns an error message with the denied event information to the event-triggering module.

A module may register or de-register sending or receipt of events at any point after the initial connection is established by sending the request directly to Event Manager 150. Note that registration of events is not considered itself to be an event.

Any module may be designated as having one or more required events, which are events that the module is required to receive regardless of whether the event was registered. For example, required events could include, but are not limited to, error messages and connection status.

An event may be a standalone transmission, such that an event is sent and no response or return receipt is required or accepted. Alternatively, if an event requires a response or return receipt, a receiving module may reply directly to the event-triggering module through the channel opened during the sending of the event. A channel is a virtual data path established between the event-triggering module and the recipient modules. This channel may also be used for the return receipt, error information and data passage.

Secure Connection Maintainer

Figure 4:
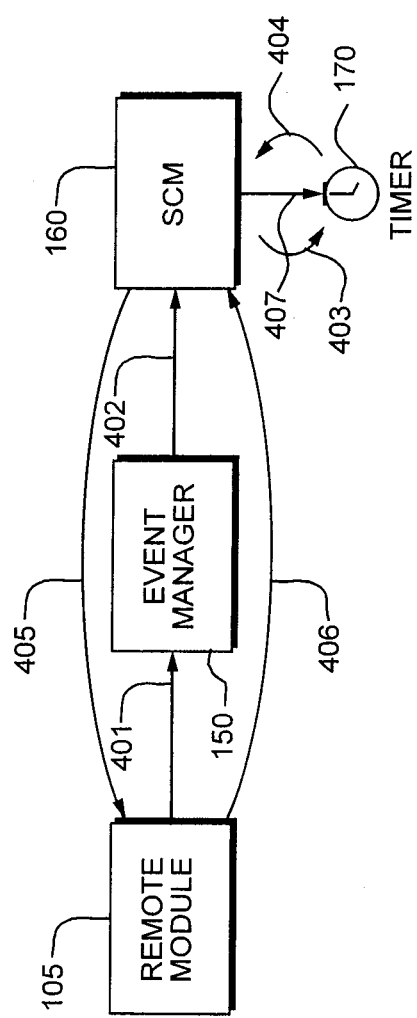
FIG. 4. is a flow chart of the process used to monitor connections, in accordance with the embodiment of FIG. 1.

The Secure Connection Maintainer monitors the connections between the Control Manager, and its trusted modules, and the Remote Modules. Timer 170 is used to periodically send status check messages to the Remote Modules. The process used to monitor these connections is shown in FIG. 4.

In step 401 Remote Module 105 establishes a connection with Event Manager 150, and in step 402, Event Manger 150 notifies Secure Connection Maintainer 160 that the connection is established. In step 403, Secure Connection Maintainer 160 starts Timer 170 for a predetermined period of time, as required by the particular application, network conditions, and hardware constraints.

At step 404, Timer 170 times out, and at step 405, Secure Connection Maintainer 160 sends a challenge question to Remote Module 105. A challenge question could be a parsable mathematical question, for example, "=2+2," calculating the value of two plus two. The challenge question is encrypted or encoded, in such a way that only Remote Module 105 may decode or decrypt it, such as by using a public/private key pair.

In step 406, Remote Module 105 decrypts or decodes the challenge question, and calculates a response. Using the example above, the correct response would be "4." The response is sent to Secure Connection Maintainer 160, and is encoded or encrypted in such a way that only Secure Connection Maintainer 160 can decode or decrypt it.

In step 407, Secure Connection Maintainer 160 decodes or decrypts the response from Remote Module 105, verifies the response, and resets Timer 170 for the next status check message.

If Remote Module 105 is unable to decode or decrypt the challenge question, calculate the response, return a correct response, and/or return a response in a predetermined amount of time, as required by the particular application, network conditions, and hardware constraints, Secure Connection Maintainer 160 sends a notice to Event Manager 150. Event Manager 150 may then decide Remote Module 105 has been compromised and disconnect it from the system. In alternative embodiments, Secure Connection Maintainer 160 may implement a retry scheme and cause the disconnect of Remote Module 105 only after a number of repeated exceptions.

The cycle of timeout, challenge and response continues for the entire length of connection between Event Manager 150 and Remote Module 105. When Remote Module 105 disconnects from Event Manager 150, Event Manager 150 sends a notice to Secure Connection Maintainer 160 and all timers for that Remote Module are disabled.

Although specific features of the invention are shown in some drawings and not others, this is for convenience only, as the features may be combined in other manners in accordance with the invention. Other embodiments will occur to those skilled in the art and are within the following claims.

What is claimed is:

1. A system for pushing messages to a plurality of networked computer modules, comprising:
   a first non-transitory computer readable medium comprising an authentication manager, for authenticating an identity of each of the plurality of networked computer modules, that, once identified, are considered authenticated modules; and
   a second non-transitory computer readable medium comprising an event manager, for receiving event registrations and events from one or more authenticated modules;
   where the event manager, upon receipt of an event from an authenticated module, transmits over one or more persistent connections a message to one or more authenticated modules based on the received event registrations, wherein the one or more persistent connections comprises a persistent transport layer connection,
   wherein the one or more authenticated modules that receives the message includes a module that is different from the authenticated module that transmits the event,
   wherein the one or more authenticated modules that receives the message is registered to accept one or more registered events and is registered to send one or more registered events,
   wherein the authenticated module that transmits the event is registered to accept one or more registered events and is registered to send one or more registered events, and
   wherein the event manager transmits the message from the authenticated module that transmits the event to the one or more authenticated modules that receives the message when the authenticated module that transmits the event is registered to send the event and the one or more authenticated modules that receives the message is registered to accept the event.

2. The system of claim 1, where each event registration includes a list of zero, one or more events that can be received by an authenticated module.

3. The system of claim 2, where the event manager, before transmitting the message to the one or more authenticated modules, verifies for each authenticated module that the received event is included in the list of events that can be received by the authenticated module.

4. The system of claim 1, where each event registration includes a list of zero, one or more events that can be sent by an authenticated module.

5. The system of claim 4, where the event manager, upon receipt of an event from an authenticated module, verifies that the received event is included in the list of events that can be sent by the authenticated module.

6. The system of claim 1, further comprising a third non-transitory computer-readable medium comprising a secure connection maintainer, for monitoring the one or more persistent connections between the plurality of modules and the event manager.

7. The system of claim 1, where the event manager sends a message receipt to the authenticated module that sent the event.

8. The system of claim 1, where one or more of the authenticated modules that received the message sends a message receipt to the authenticated module that sent the event.

9. The system of claim 1, where the event manager sends a message reply to the authenticated module that sent the event.

10. The system of claim 1, where one or more of the authenticated modules that received the messages sends a message reply to the authenticated module that sent the event.

11. The system of claim 1, where the authentication manager further authorizes the persistent connection between the authenticated module and the event manager.

12. The system of claim 11, where the connection is a secure connection.

13. The system of claim 1, where an event sent from an authenticated module includes a data field, and the message transmitted to the one or more authenticated modules includes the data field.

14. The system of claim 1, where the message transmitted to the one or more authenticated modules is encrypted.

15. A system for pushing messages to a plurality of networked computer modules, comprising:
   a first non-transitory computer-readable medium comprising an authentication manager, for authenticating an identity of each of the plurality of networked computer modules, that, once identified, are considered authenticated modules; and a second non-transitory computer-readable medium comprising an event manager, for receiving event registrations and events from one or more authenticated modules;

where each event registration includes a list of zero, one or more events that can be received by an authenticated module and a list zero, one or more events that can be sent by an authenticated module; and where the event manager, upon receipt of an event from an authenticated module, transmits a message over one or more persistent connections to one or more authenticated modules based on the received event registrations, wherein the one or more persistent connections comprises a persistent transport layer connection, wherein the one or more authenticated modules that receives the message includes a module that is different from the authenticated module that transmits the event, wherein the one or more authenticated modules that receives the message is registered to accept one or more registered events and is registered to send one or more registered events, wherein the authenticated module that transmits the event is registered to accept one or more registered events and is registered to send one or more registered events, and wherein the event manager transmits the message from the authenticated module that transmits the event to the one or more authenticated modules that receives the message when the authenticated module that transmits the event is registered to send the event and the one or more authenticated modules that receives the message is registered to accept the event.

16. The system of claim 15, where the event manager, upon receipt of an event from an authenticated module, verifies that the received event is included in the list of events that can be sent by the authenticated module, and where the event manager, before transmitting the message to the one or more authenticated modules, verifies for each authenticated module that the received event is included in the list of events that can be received by the authenticated module.

17. The system of claim 16, further comprising a third non-transitory computer readable-medium comprising a secure connection maintainer, for monitoring the one or more persistent connections between the plurality of modules and the event manager.

18. A method for pushing messages to a plurality of networked computer modules, comprising:
receiving one or more event registrations from one or more authenticated modules;
receiving an event from an authenticated module; and
transmitting a message over one or more persistent connections to one or more authenticated modules based on the received event registrations, wherein the one or more persistent connections comprises a persistent transport layer connection,
wherein the one or more authenticated modules that receives the message includes a module that is different from the authenticated module that transmits the event,
wherein the one or more authenticated modules that receives the message is registered to accept one or more registered events and is registered to send one or more registered events,
wherein the authenticated module that transmits the event is registered to accept one or more registered events and is registered to send one or more registered events, and
wherein the event manager transmits the message from the authenticated module that transmits the event to the one or more authenticated modules that receives the message when the authenticated module that transmits the event is registered to send the event and the one or more authenticated modules that receives the message is registered to accept the event.

19. The method of claim 18, where each of the one or more event registrations includes a list of zero, one or more events that can be received by an authenticated module and a list of zero, one or more events that can be sent by an authenticated module.

20. The method of claim 19, further comprising verifying that the received event is included in the list of events that can be sent by the authenticated module.

21. The method of claim 19, further comprising verifying that the received event is included in the list of events that can be received by each of the authenticated modules.

22. A method for pushing messages to a plurality of networked computer modules, comprising:
authenticating the identity of each of the networked computer modules;
establishing a connection between the authenticated module and an event manager;
registering a list of events that can be sent and received with the event manager;
receiving an event from an authenticated module; and
transmitting a message over one or more persistent connections to each authenticated module that has registered for the event: wherein the one or more persistent connections comprises a persistent transport layer connection,
wherein the one or more authenticated modules that receives the message includes a module that is different from the authenticated module that transmits the event,
wherein the one or more authenticated modules that receives the message is registered to accept one or more registered events and is registered to send one or more registered events,
wherein the authenticated module that transmits the event is registered to accept one or more registered events and is registered to send one or more registered events, and
wherein the event manager transmits the message from the authenticated module that transmits the event to the one or more authenticated modules that receives the message when the authenticated module that transmits the event is registered to send the event and the one or more authenticated modules that receives the message is registered to accept the event.

23. The method of claim 22, further comprising monitoring the status of the connection between the authenticated module and the event manager.

* * * * *